(12) United States Patent
Kim et al.

(10) Patent No.: US 7,412,140 B2
(45) Date of Patent: Aug. 12, 2008

(54) APPARATUS FOR ACQUIRING IMAGE INFORMATION USING ARRAY OF IMAGE ACQUISITION UNITS HAVING OPTICAL DEVICE

(75) Inventors: Young-Sun Kim, Gyeonggi-do (KR); Seok-Woo Hwang, Gyeonggi-do (KR); Soo-Hyun Lee, Gyeonggi-do (KR)

(73) Assignee: LS Cable Ltd., Seoul (KR)

( * ) Notice: Subject to any disclaimer, the term of this patent is extended or adjusted under 35 U.S.C. 154(b) by 898 days.

(21) Appl. No.: 10/786,821

(22) Filed: Feb. 25, 2004

(65) Prior Publication Data
US 2004/0165847 A1    Aug. 26, 2004

(30) Foreign Application Priority Data
Feb. 25, 2003    (KR)    .............. 10-2003-0011828

(51) Int. Cl.
*G02B 6/06* (2006.01)
(52) U.S. Cl. ..................................... 385/116
(58) Field of Classification Search .................. 385/116
See application file for complete search history.

(56) References Cited

U.S. PATENT DOCUMENTS

| | | | | |
|---|---|---|---|---|
| 4,672,437 A | * | 6/1987 | Casper | ........................ 385/116 |
| 4,978,195 A | * | 12/1990 | Takano et al. | ................ 385/116 |
| 5,103,304 A | * | 4/1992 | Turcheck et al. | ............ 348/130 |
| 5,287,293 A | * | 2/1994 | Chen et al. | ..................... 702/40 |

FOREIGN PATENT DOCUMENTS

JP    10-276-367    10/1998

* cited by examiner

*Primary Examiner*—Quyen P Leung
(74) *Attorney, Agent, or Firm*—Jones Day

(57) ABSTRACT

The present invention relates to an apparatus for acquiring image information using array of image acquisition units, each having an optical device. The apparatus for acquiring image information includes a geometric array of image acquisition units, each having optical device generating source electrical signal depending on image intensity of a subject, and an image signal output unit for receiving electrical signal generated from the array and generating source electrical signal to process analog image. According to the present invention, costs required for building a system for acquiring image information may be reduced. In addition, it is possible to fast acquire image information, thereby usefully applying to image information acquisition in fast total inspection process. Furthermore, various values with respect to a dimension of the subject are easily calculated by using a geometry location and dimension information of the image acquisition units.

19 Claims, 5 Drawing Sheets

APPARATUS FOR ACQUIRING IMAGE INFORMATION USING ARRAY OF IMAGE ACQUISITION UNITS HAVING OPTICAL DEVICE

BACKGROUND OF THE INVENTION

1. Field of the Invention

The present invention relates to an apparatus for quickly acquiring image information of a subject, and more particularly to an apparatus for accurately acquiring and quickly processing image information regardless of geometric shape of a subject by variously arranging optical devices in accordance with a shape of the subject and purpose of image acquisition.

2. Description of the Related Art

Recently, in order to acquire image information for various examinations of a product in an automatic production line of various industries, a vision system which is provided with convenience and multiple functions and easily standardized even in process application is widely used.

An industrial vision system generally includes a CCD (Charge Coupled Device) camera having a CCD chip in which photosensitive devices in a pixel unit are integrated at high density so as to precisely acquire image information, a frame grabber for periodically (generally per 33 msec) acquiring and digitalizing the image information obtained by the CCD camera, and a computer for processing the digitalized image information in accordance with the purpose of image information acquisition.

The conventional vision system described above is advantageous in the fact that it may precisely acquire image information of a subject, and particularly the image information may have various sizes if a lens system is additionally adopted. However, the conventional vision system has disadvantages as below.

First, since photosensitive devices are integrated only in a square or linear shape in the CCD chip of the camera of the vision system, an error is apt to occur between an original image of a subject and the obtained image information if the subject is curved or distorted.

Second, as previously described, since the vision system should periodically digitalize an image frame photographed by the CCD camera, a minimum critical time is required to acquire accurate image information. Accordingly, the vision system cannot acquire the image of the subject as precisely as its original performance in a fast process such as the total inspection (i.e., 100% inspection).

Third, the vision system requires significant costs for implementation and professional workers for coding computer programs to process the image information.

SUMMARY OF THE INVENTION

The present invention is designed to solve the problems of the prior art, and therefore an object of the present invention is to provide an improved apparatus for image acquisition capable of precisely acquiring image information by timely changing its configuration suitable for a subject though a geometric shape of the subject is complicated or changed, and capable of easily acquiring accurate image information even in a fast process by reducing image information processing time, as well as allowing to build an image acquisition system at a low cost.

In order to accomplish the object, the present invention provides an apparatus for acquiring image information using an array of image acquisition units, each having an optical device, according to one embodiment of the present invention, which includes a geometric array of image acquisition units, each having optical device generating an electrical signal depending on image intensity of a subject, and an image signal output unit for receiving the electrical signal generated from the array and then generating a source electrical signal to process analog image.

In the apparatus for acquiring image information according to one embodiment of the present invention, the array is preferably changeable in accordance with a geometric shape of the subject. For example, the image acquisition unit may be arranged in a square, radial, or circular shape or combination thereof.

In the apparatus for acquiring image information, the image acquisition unit may include an image collection lens unit for first collecting image from the subject, an optical fiber bundle for transmitting image optical information collected from the image collection lens unit, an image intermediating lens unit for intermediating the subject image transmitted through the optical fiber bundle to an image acquisition lens unit, and a light-receiving element for generating an electrical signal depending on intensity of the subject image acquired through the image acquisition lens unit. In this case, the image acquisition unit preferably includes an optical path arrangement unit for keeping the image intermediating lens unit and the image acquisition lens unit airtight from outer air and arranging optical paths of the image intermediating lens unit and the image acquisition lens unit. In some cases, the image acquisition unit may further include an installation unit having a plurality of through holes so that an end of the image collection lens unit is inserted therein to be exposed outward when the image acquisition unit is arranged in a predetermined geometric shape.

The apparatus for acquiring image information may further include an image information processing unit for generating analog image information by processing the source electrical signal, and an image information display unit for displaying the analog image information generated through the image information processing unit.

In addition, the apparatus for acquiring image information may further include a light emitting unit having an optical device or a geometric array thereof in order to supplement deficient light quantity.

Moreover, it is desirable that a program for calculating a value with respect to dimension of the subject by using geometric location and dimension information of the image acquisition unit is installed in the apparatus.

An apparatus for acquiring image information according to another embodiment of the present invention includes a plurality of image measurement terminal arrays including an image collection lens unit for first collecting image from a subject and an optical fiber bundle for transmitting image optical information collected from the image collection lens unit, an optical switching unit for switching optical signals for a subject image generated from a plurality of the arrays, an array of image sensor units, each having an image intermediating lens unit for intermediating the optical signal output via the optical switching unit to an image acquisition unit and a light-receiving element for generating an electrical signal depending on intensity of the subject image obtained from the image acquisition lens unit, and an image signal output unit for receiving the electrical signal generated from the array of the image sensor unit and then outputting a source electrical signal to process analog image.

It is preferable that each of the image measurement terminal arrays is changeable in accordance with a geometric shape of the subject. For example, the image measurement terminals may be arranged in square, radial, or circular shape, or combination thereof.

In addition, each of the image sensor units preferably includes an optical path arrangement unit for keeping the image intermediating lens unit and the image acquisition lens unit airtight from outer air and arranging optical paths of the image intermediating lens unit and the image acquisition lens unit.

On the other hand, the apparatus for acquiring image information may further include an installation unit having a plurality of through holes so that an end of the image collection lens unit is inserted therein to be exposed outward when the image measurement terminal is arranged in a predetermined geometric shape.

In addition, the apparatus for acquiring image information may further include a light emitting unit having an optical device or a geometric array thereof in order to supplement deficient light quantity, an image information processing unit for generating analog image information by processing the source electrical signal, and an image information display unit for displaying the analog image information generated through the image information processing unit.

It is desirable that a program for calculating a value with respect to dimension of the subject by using geometry location and dimension information of the image acquisition unit is installed in the apparatus.

BRIEF DESCRIPTION OF THE DRAWINGS

Other objects and aspects of the present invention will become apparent from the following description of embodiments with reference to the accompanying drawings. In the drawings.

DESCRIPTION OF THE PREFERRED EMBODIMENT

Figure 1:
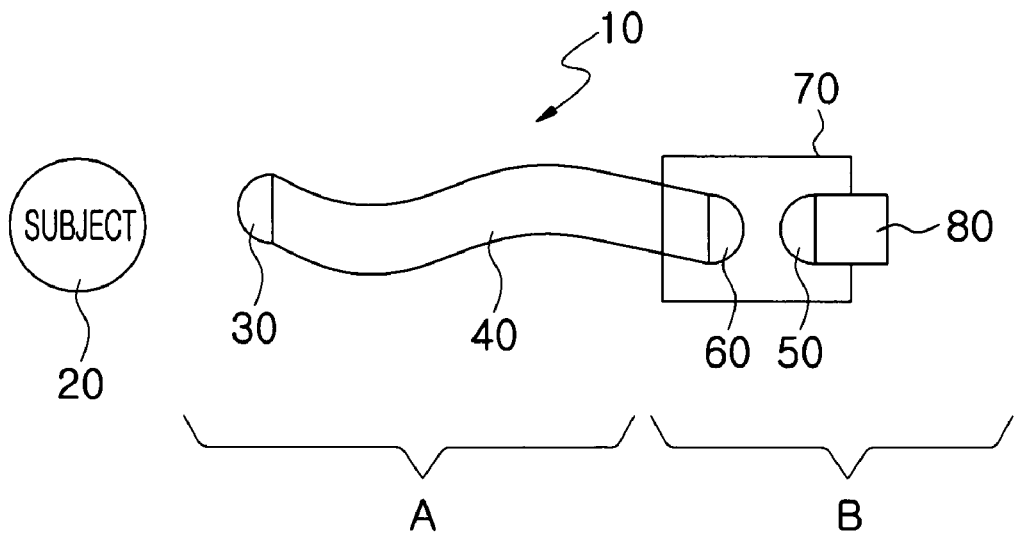
FIG. 1 is a schematic diagram showing an image acquisition unit having an optical device according to one embodiment of the present invention.

Hereinafter, the present invention will be described in more detail referring to the drawings. First of all, terminologies or words used in this specification and claims should not be limitedly interpreted as common or dictionary significance, but be interpreted as significance and meaning corresponding to technical phenomenon of the present invention according to the principle that an inventor may adequately define meaning of terminologies in order to skillfully describe his/her invention. Accordingly, it should be understood that the detailed description and specific examples, while indicating preferred embodiments of the invention, are given by way of illustration only, since various changes and modifications within the spirit and scope of the invention will become apparent to those skilled in the art from this detailed description.

An apparatus for acquiring image information according to one embodiment of the present invention acquires image information of a subject 20 by using an image acquisition unit 10 having an optical device as a fundamental configuration as illustrated in FIG. 1. The image acquisition unit 10 having an optical device includes an image measurement terminal A having an image collection lens unit 30 for collecting image from the subject 20 and an optical fiber bundle 40 for optical transmission of the image collected from the image collection lens unit 30; and an image sensor unit B having an image intermediating lens unit 60 for intermediating the image information transmitted through the optical fiber bundle 40 to an image acquisition lens unit 50, an optical path arrangement unit 70 for keeping the image intermediating lens unit 60 and the image acquisition lens unit 50 airtight from outer air and arranging optical paths of the image intermediating lens unit 60 and the image acquisition lens unit 50, and an optical device unit 80 for generating an electrical signal depending on the intensity of the subject image acquired through the image acquisition lens unit 50.

The image collection lens unit 30 and the image intermediating lens unit 60 are spaced apart from each other as much as a predetermined distance, and the optical fiber bundle 40 is interposed between them. In some cases, the distance between the image collection lens unit 30 and the image intermediating lens unit 60 may be extended longer by using an optical fiber connection device (not shown). The optical device unit 80 more preferably adopts a photo diode or a phototransistor, which is a cheap light-receiving element not requiring a frame grabber for digitalizing image information periodically, rather than an expensive CCD (Charge Coupled Device) chip or CMOS (Complementary Metal Oxide Semiconductor) chip for acquiring image. However, it should be understood that the specific examples are given by way of illustration only, since various changes and modifications within the sprit and scope of the invention will become apparent to those skilled in the art.

Figure 2A:
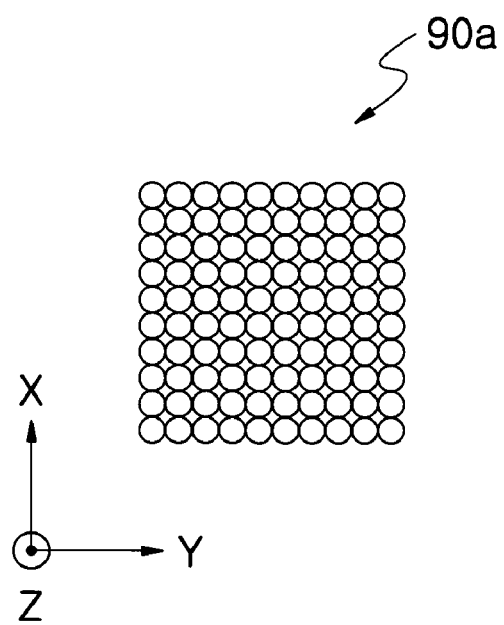
FIGS. 2*a*, 2*b*, and 3 show examples of array of image acquisition units, each having an optical device, according to one embodiment of the present invention.
Figure 2B:
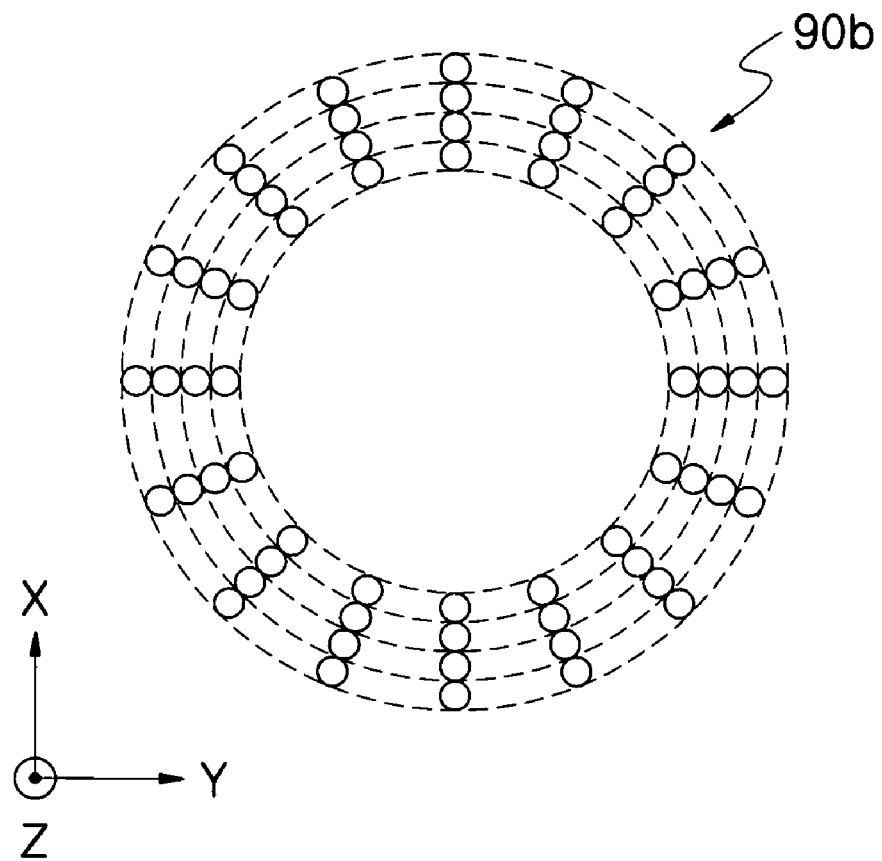

The apparatus for acquiring image information according to the present invention includes an array of image acquisition units having an optical device (90*a* or 90*b*: hereinafter referred to 'unit array') in which the image acquisition units 10, each having an optical device, are arranged in a geometric shape as shown in FIGS. 2*a* and 2*b* to fit with a shape of the subject.

The unit array (90*a* or 90*b*) shown in FIGS. 2*a* and 2*b* illustrates only the image collection lens unit 30 provided in the image acquisition unit 10, not showing other components of the image acquisition unit 10. However, as well known in the art, the image measurement terminal A and the image sensor unit B are combined in a certain way.

Figure 3:
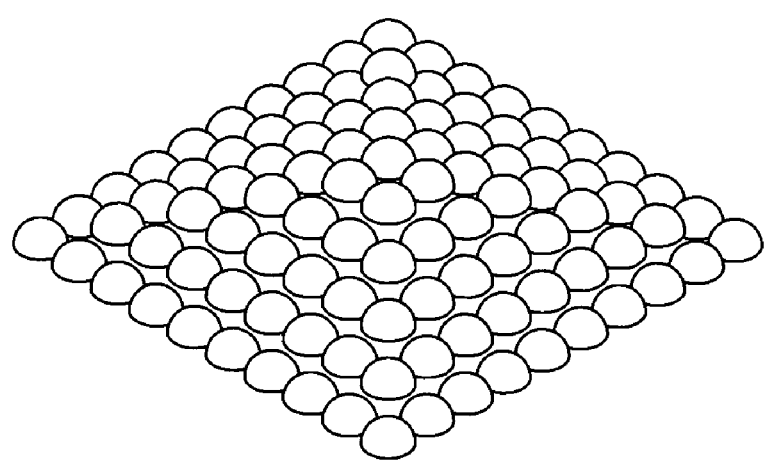

In the present invention, when the image acquisition unit 10 is arranged, it is not requisite that the image collection lens unit 30 of each image acquisition unit 10 are located on the same plane (e.g., Z=0). If the subject is curved or distorted, the image collection lens unit 30 may be located at an optimal location of 3-dimensional space selected by using an experimental method, as shown in FIG. 3. In this case, the image collection lens unit 30 of each image acquisition unit 10 may not be located on the same plane.

If a dimension of the subject is larger than the unit array (90a or 90b), it is possible to acquire overall image information of the subject in an enlarged or reduced state by adopting a lens system in the entire image measurement terminal A composing the array.

The apparatus for acquiring image information according to the present invention preferably further includes an installation unit (not shown) for facilitating easy arrangement of the image acquisition units 10. In this case, it is desirable that the installation unit is made of durable materials, i.e., plastics or non-caustic metal materials. In addition, the installation unit preferably includes a plurality of through holes so that an end of the image collection lens unit is inserted therein to be exposed outward when the image acquisition unit 10 is arranged in a predetermined geometric shape. If the apparatus for acquiring image information include the installation unit, it is advantageous that an apparatus supervisor may easily arrange the image acquisition units 10.

Figure 4:
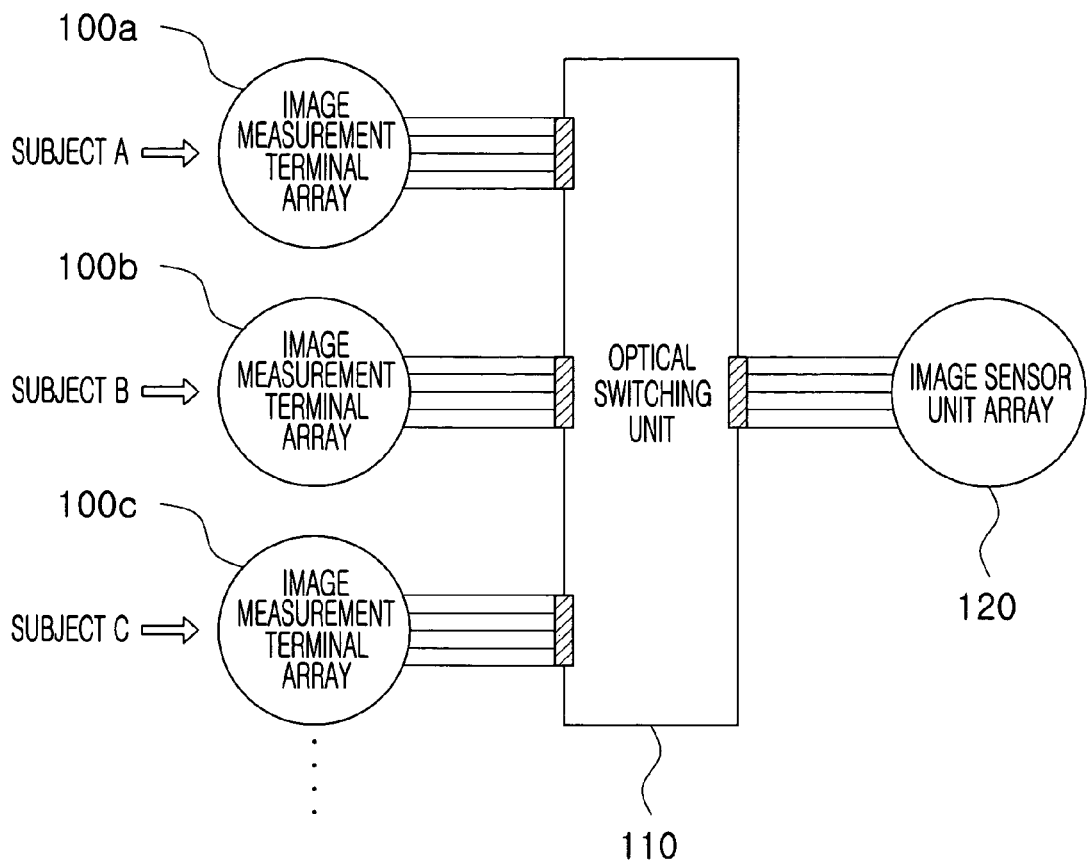
FIG. 4 is a schematic diagram showing an apparatus for acquiring image information using array of image acquisition units, each having an optical device, which has a switching function according to one embodiment of the present invention.

As shown in FIG. 4, the apparatus for acquiring image information may alternatively include a plurality of image measurement terminal arrays (100a, 100b, and 100c) for acquiring images from a plurality of subjects, an optical switching unit 110 for switching images generated through a plurality of the image measurement terminal arrays (100a, 100b, and 100c), and an image sensor unit array 120 for acquiring the image switched through the optical switching unit 110.

In this case, the apparatus is capable of acquiring image information of subjects different from each other through one array of image sensor units 120 by switching the optical switching unit 110. Here, it is preferable that the number of the image measurement terminals A of the image acquisition unit 10 in each image measurement terminal array (100a, 100b and 100c) is identical to that of the image sensor units B in the image sensor unit array 120, but limited to this case.

Figure 5:
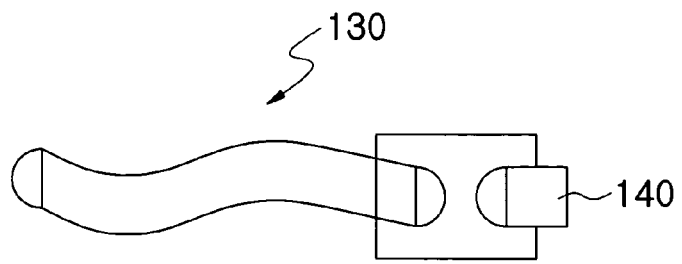
FIG. 5 is a schematic diagram showing a light emitting unit having an optical device according to one embodiment of the present invention.

On the other hand, if it is difficult to acquire image information of the subject due to deficient light quantity, the apparatus for acquiring image information may further include a light emitting unit 130 having an optical device, as shown in FIG. 5. In this case, the apparatus may further include a light emitting unit array in which the light emitting units 130 are arranged in a geometric shape as shown in FIGS. 2a and 2b. The light emitting unit 130 is identical to the image acquisition unit 10 illustrated in FIG. 1, except that the light-receiving element 80 illustrated in FIG. 1 is replaced with a light emitting element 140 (e.g., a light emitting diode). In addition, the light emitting unit 130 should be connected to a power supply (not shown) capable of providing the light element 140 with electrical energy, as well known in the art.

Figure 6:
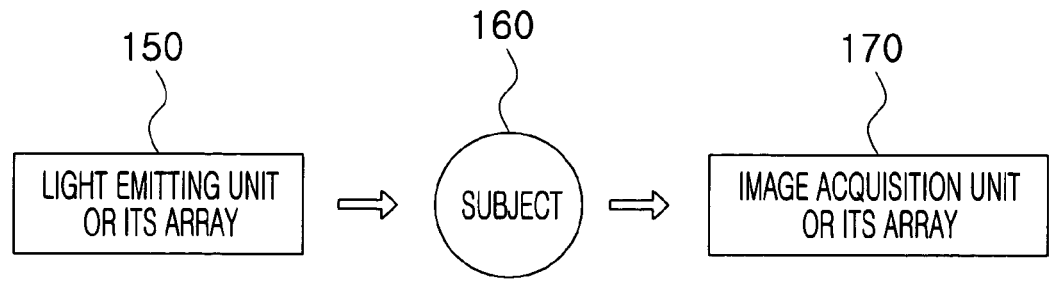
FIG. 6 is a schematic diagram showing arrangement between an image acquisition unit having an optical device or array thereof and a light emitting unit having an optical device or array thereof according to one embodiment of the present invention.

As shown in FIG. 6, a light emitting unit or an array thereof 150 is located at an opposite place to an image acquisition unit or an array thereof 170 on the basis of a subject 160.

Figure 7:
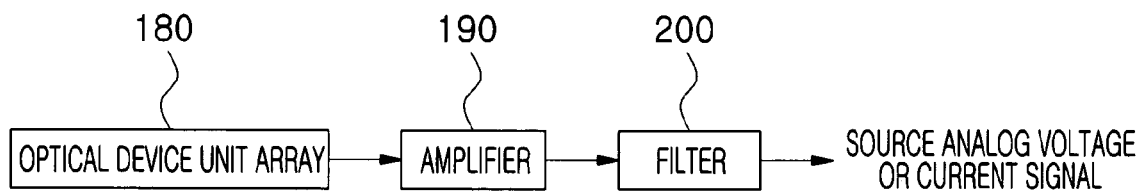
FIG. 7 is a schematic block diagram illustrating a process for processing image signal according to one embodiment of the present invention.

As illustrated in FIG. 7, the apparatus for acquiring image information may obtain source analog voltage or current signal with respect to image of the subject by passing an electrical signal, which is generated from each image acquisition unit composing the optical device unit array 180 depending on intensity of the subject image be passed into an amplifier 190 and a filter 200. The apparatus for acquiring image information may process the source analog voltage or current signal by using the image information processing unit which adopts an analog image processing technique well known in the art, and display the signal through an image display, namely a particular display device, in analog.

Alternatively, the apparatus for acquiring image information may be used in various product examination processes by converting analog image information to digital image information and analyzing the image by a computer.

Since the apparatus for acquiring image information according to the present invention is capable of generating the image information of the subject in the form of an analog signal, the time is seldom required to acquire image information. Thus, the apparatus is desirably used in a fast total inspection process (i.e., 100% inspection) in order to acquire the total image information of a product.

Figure 8:
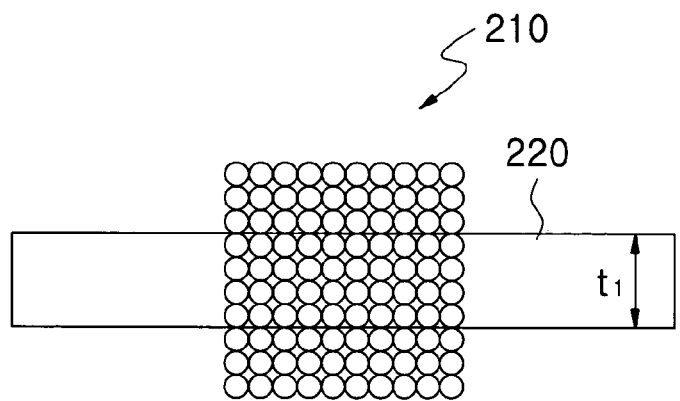
FIGS. 8 and 9 are schematic illustration for describing a process for calculating various values of a subject using an apparatus for acquiring image information according to one embodiment of the present invention.

On the other hand, the apparatus may be used for calculating simple values such as thickness of the subject. For example, as shown in FIG. 8, if an optical device unit array 210 has a square shape and a subject 220 has a tabular shape, an image acquisition signal of a portion hidden by the subject 220 is different from that of a non-hidden portion while acquiring image. Accordingly, if a program for executing the below mathematical formula 1 is installed in the apparatus for acquiring image information, a thickness ($t_1$) of the subject 220 may be calculated automatically by calculating the number of image acquisition units hidden by the subject 220 and applying the same to the program. Here, a method for calculating the thickness of the subject 220 may be variously modified by those skilled in the art.

Mathematical Formula 1

Figure 9:
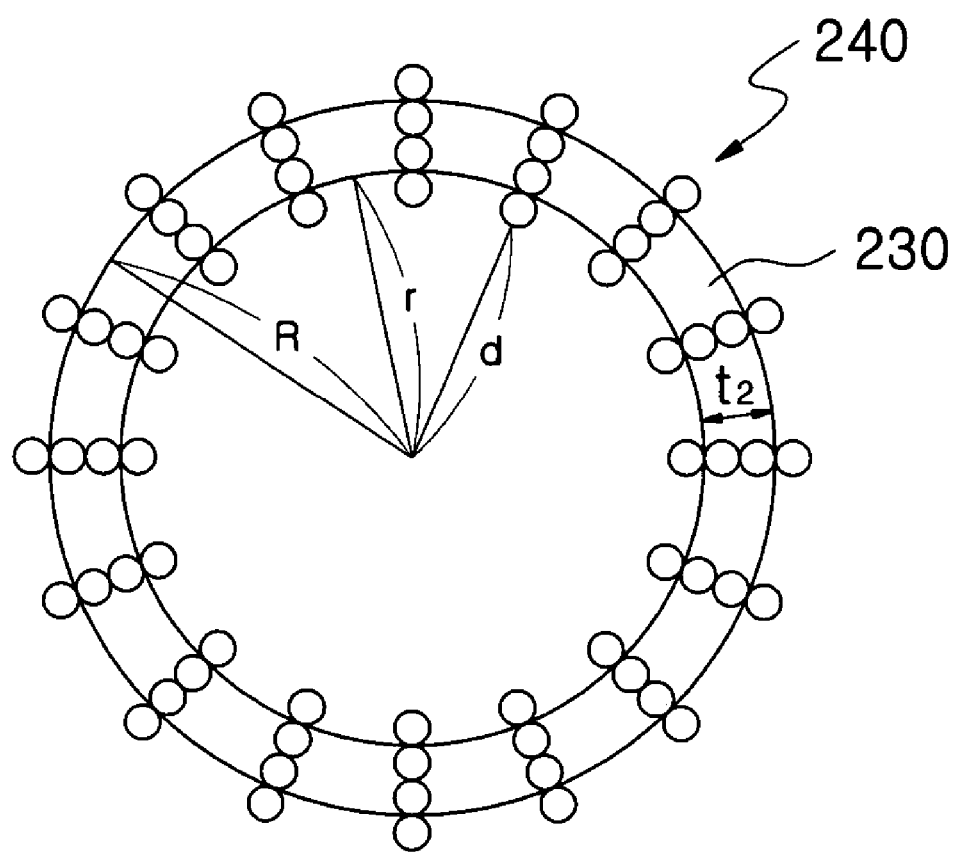

Thickness ($t_1$)=[(the number of hidden image acquisition units)÷(the number of image acquisition units located on a horizontal row)]×thickness (diameter) of an image acquisition unit As shown in FIG. 9, if the subject 230 has a ring shape and the image acquisition unit array 240 has a radial shape, various dimensions such as an inner diameter, an outer diameter and a thickness of the subject 230 may be easily calculated by using the following mathematical formula 2. Here, various modifications are possible to those skilled in the art for its concrete calculation method.

Mathematical Formula 2

Thickness($t_2$)=[(the number of hidden image acquisition units)÷(the number of groups of radially-arranged units)]× thickness (diameter) of an image acquisition unit inner diameter (r)=d+thickness (diameter) of image acquisition unit outer diameter (R)=r+$t_2$ Here, d is a distance from the center of the subject to the innermost image acquisition unit.

APPLICABILITY TO THE INDUSTRY

According to one aspect of the present invention, the apparatus for acquiring image information may be useful in a fast inspection process, differently to the vision system, since it can acquire image information of a subject using simple analog optical signal processing without complicated and periodical digitalizing process of image information adopted in the vision system.

According to another aspect of the present invention, the apparatus may easily measure value information such as thickness of a subject by using a geometric arrangement of image acquisition units, each having an optical device, and dimension information of the image acquisition unit.

According to yet another aspect of the present invention, it is possible to reduce costs required for producing the apparatus by using an inexpensive optical device.

According to still another aspect of the present invention, it is possible to acquire image information for a plurality of subjects by one apparatus, and to measure various geometric values of each subject.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An apparatus for acquiring image information using an array of an image acquisition units, each having an optical device, comprising:
    a geometric array of image acquisition units, each having an image collecting lens unit, optical fiber bundle transmitting the light signal collected though the image collecting lens, and an image sensor unit transforming the transmitted light signal into an electric signal; and
    an image signal output unit for receiving the electrical signal from the array and then generating a source electrical signal to process analog image.

2. The apparatus for acquiring image information according to claim 1,
    wherein the array of image acquisition units is changeable in accordance with a geometric shape of the subject.

3. The apparatus for acquiring image information according to claim 1,
    wherein the array of image acquisition units has a square, radial or circular shape, or combination thereof.

4. The apparatus for acquiring image information according to claim 1, wherein the image acquisition unit includes:
    an image collection lens unit for first collecting image from the subject;
    an optical fiber bundle for transmitting the image optical information collected from the image collection lens unit;
    an image intermediating lens unit for intermediating the subject image transmitted through the optical fiber bundle to an image acquisition lens unit; and
    a light-receiving element for generating an electrical signal depending on intensity of the subject image acquired through the image acquisition lens unit.

5. The apparatus for acquiring image information according to claim 4, wherein the image acquisition unit further includes an optical path arrangement unit for keeping the image intermediating lens unit and the image acquisition lens unit airtight from outer air and arranging optical paths of the image intermediating lens unit and the image acquisition lens unit.

6. The apparatus for acquiring image information according to claim 4,
    wherein the image acquisition unit further includes an installation unit having a plurality of through holes so that an end of the image collection lens unit is inserted therein to be exposed outward when the image acquisition unit is arranged in a predetermined geometric shape.

7. The apparatus for acquiring image information according to claim 1, further comprising:
    an image information processing unit for generating analog image information by processing the source electrical signal; and
    an image information display unit for displaying the analog image information generated through the image information processing unit.

8. The apparatus for acquiring image information according to claim 1, further comprising a light emitting unit having an optical device for supplementing deficient light quantity.

9. The apparatus for acquiring image information according to claim 1, further comprising an array of light emitting units, each having an optical device, which supplements deficient light quantity and is arranged in a geometric shape.

10. The apparatus for acquiring image information according to claim 1,
    wherein a program for calculating a value with respect to dimension of the subject by using geometric location and dimension information of the image acquisition unit is installed in the apparatus.

11. An apparatus for acquiring image information using an array of image acquisition units, each having an optical device, comprising:
    a plurality of image measurement terminal arrays including an image collection lens unit for first collecting image from a subject and an optical fiber bundle for transmitting image optical information collected from the image collection lens unit;
    an optical switching unit for switching optical signals for a subject image generated from a plurality of the arrays;
    an array of image sensor units, each having an image intermediating lens unit for intermediating the optical signal output via the optical switching unit to an image acquisition unit and a light-receiving element for generating an electrical signal depending on intensity of the subject image obtained from the image acquisition lens unit; and
    an image signal output unit for receiving the electrical signal generated from the array of the image sensor unit and then outputting a source electrical signal to process analog image.

12. The apparatus for acquiring image information according to claim 11,
    wherein each of the image measurement terminal arrays is changeable in accordance with a geometric shape of the subject.

13. The apparatus for acquiring image information according to claim 11,
    wherein the image measurement terminals are arranged in a square, radial or circular shape, or combination thereof.

14. The apparatus for acquiring image information according to claim 11,
    wherein each of the image sensor units includes an optical path arrangement unit for keeping the image intermediating lens unit and the image acquisition lens unit airtight from outer air and arranging optical paths of the image intermediating lens unit and the image acquisition lens unit.

15. The apparatus for acquiring image information according to claim 11, further comprising an installation unit having a plurality of through holes so that an end of the image collection lens unit is inserted therein to be exposed outward when the image measurement terminal is arranged in a predetermined geometric shape.

16. The apparatus for acquiring image information according to claim 11, further comprising a light emitting unit having an optical device for supplementing deficient light quantity.

17. The apparatus for acquiring image information according to claim 11, further comprising an array of light emitting units, each having an optical device, which supplements deficient light quantity and is arranged in a geometric shape.

18. The apparatus for acquiring image information according to claim 11, further comprising:

an image information processing unit for generating analog image information by processing the source electrical signal; and an image information display unit for displaying the analog image information generated through the image information processing unit.

19. The apparatus for acquiring image information according to claim 11, wherein a program for calculating a value with respect to dimension of the subject by using geometry location and dimension information of the image acquisition unit is installed in the apparatus.

* * * * *